(12) United States Patent
Froehlich et al.

(10) Patent No.: US 11,496,811 B2
(45) Date of Patent: Nov. 8, 2022

(54) SYSTEMS AND METHODS FOR IMPROVING COMMUNICATIONS NETWORK PERFORMANCE USING VIDEO SESSION DATA

(71) Applicant: NetScout Systems, Inc., Westford, MA (US)

(72) Inventors: Robert W. Froehlich, McKinney, TX (US); Wing F. Lo, Plano, TX (US); Karsten Gaenger, Berlin (DE)

(73) Assignee: NetScout Systems, Inc., Westford, MA (US)

( * ) Notice: Subject to any disclaimer, the term of this patent is extended or adjusted under 35 U.S.C. 154(b) by 116 days.

(21) Appl. No.: 17/099,256

(22) Filed: Nov. 16, 2020

(65) Prior Publication Data
US 2022/0159347 A1    May 19, 2022

(51) Int. Cl.
*H04N 21/647* (2011.01)
*H04L 41/5003* (2022.01)
*H04W 24/08* (2009.01)
*H04W 72/04* (2009.01)

(52) U.S. Cl.
CPC ... *H04N 21/64723* (2013.01); *H04L 41/5003* (2013.01); *H04N 21/64769* (2013.01); *H04W 24/08* (2013.01); *H04W 72/042* (2013.01)

(58) Field of Classification Search
None
See application file for complete search history.

(56) References Cited

U.S. PATENT DOCUMENTS

| 9,485,679 | B2 * | 11/2016 | Kreher | H04W 24/04 |
| 2017/0237777 | A1 * | 8/2017 | Joch | H04L 63/1408 |
| | | | | 713/152 |

* cited by examiner

*Primary Examiner* — Omar S Parra
(74) *Attorney, Agent, or Firm* — Foley & Lardner LLP

(57) ABSTRACT

A method for assessing and improving network performance using video session data. Control plane signaling data comprising geographic location data from network monitoring equipment connected to a communications network is collected. Video session data comprising data of a plurality of video sessions from video monitoring equipment connected to the communications network is collected. The plurality of video sessions are associated with a plurality of mobile devices streaming videos on the respective mobile device across the communications network. The video session data and control plane signaling data within a cell of the communications network is correlated. The correlated data is provided to a communications network provider. The communications network is reorganized according to the correlated data.

13 Claims, 7 Drawing Sheets

200

202

| Cell | Timestamp | IMSI | Latitude | Longitude |
|---|---|---|---|---|
| 506 | 5:00 | 515115115154685 | 40.7129° N | 74.0061° W |
| 123 | 15:00 | 115178151451154 | 40.8229° N | 76.0168° W |
| 506 | 11:00 | 48597263586215 | 40.7128° N | 74.0060° W |
| 1113 | 16:00 | 451633398654245 | 42.8729° N | 76.0521° W |
| 222 | 20:00 | 879562435894215 | 39.4522° N | 78.4581° W |

204

| Session ID | Timestamp | IMSI | Application Type | Session Parameters |
|---|---|---|---|---|
| 1 | 2:32 | 963285875154525 | 1 | ... |
| 2 | 5:00 | 515115115154685 | 5 | ... |
| 3 | 8:23 | 489875293859452 | 6 | ... |
| 4 | 16:00 | 451633398654245 | 2 | ... |
| 5 | 18:18 | 546282435894215 | 4 | ... |

FIG. 2

SYSTEMS AND METHODS FOR IMPROVING COMMUNICATIONS NETWORK PERFORMANCE USING VIDEO SESSION DATA

BACKGROUND

The following description is provided to assist the understanding of the reader. None of the information provided or references cited is admitted to be prior art.

Wireless Service Providers (WSPs) recently have stated that 60-80% of their Radio Access network (RAN) traffic is streaming video. These video sessions may be streamed by video providers to Over the Top (OTT) applications executed on client devices and/or by forthcoming WSP's themselves.

Providers for video sessions may attempt to obtain the best quality of experience (QOE) for their subscribers. Signaling wise, the providers may wish to provide their videos with at least 1080-pixel resolution (ideally high definition) regardless of the network resource load such streaming may put on a communications network (e.g., a cellular network). In some cases, through a RAN system, a communications network provider may attempt to allocate radio bearers using a 'fair to all' system (e.g., a system in which different video providers are allocated the same amount of network resources). Unfortunately, even under the fair to all system, cells can frequently become congested due to a large number of requests for high quality of service video sessions.

SUMMARY

At least one aspect of a technical solution to the aforementioned problem is directed to a method. The method may comprise collecting, by one or more processors, control plane signaling data comprising geographic location data from network monitoring equipment connected to a communications network; collecting, by the one or more processors, video session data comprising data of a plurality of video sessions from video monitoring equipment connected to the communications network, the plurality of video sessions associated with a plurality of mobile devices streaming videos on the respective mobile device across the communications network; correlating, by the one or more processors, the video session data and the control plane signaling data within a cell of the communications network based at least on the geographic location data of the control plane signaling data; providing, by the one or more processors, to a communications network provider associated with the communications network, the correlated video session data and control plane signaling data, wherein the communications network provider reorganizes the communications network according to the correlated video session data and control plane signaling data to provide improved communications network performance.

At least one aspect of this technical solution is directed to a system. The system may comprise one or more processors in communication with video monitoring equipment connected to the communications network and network monitoring equipment connected to the communications network, the processor having programmed instructions that, when executed, cause the processor to: collect control plane signaling data comprising geographic location data from the network monitoring equipment connected to the communications network; collect video session data comprising data of a plurality of video sessions from the video monitoring equipment connected to the communications network, the plurality of video sessions associated with a plurality of mobile devices streaming videos on the respective mobile device across the communications network; correlate the video session data and the control plane signaling data within a cell of the communications network based at least on the geographic location data of the control plane signaling data; and provide, to a communications network provider associated with the communications network, the correlated video session data and control plane signaling data, wherein the communications network provider reorganizes the communications network according to the correlated video session data and control plane signaling data.

At least one aspect of this technical solution is directed to a non-transitory computer-readable storage medium storing executable instructions that, when executed by one or more processors, cause the one or more processors to provide improved video playback across a communications network. The instructions may comprise instructions to collect control plane signaling data comprising geographic location data from network monitoring equipment connected to the communications network; collect video session data comprising data of a plurality of video sessions from video monitoring equipment connected to the communications network, the plurality of video sessions associated with a plurality of mobile devices streaming videos on the respective mobile device across the communications network; correlate the video session data and the control plane signaling data within a cell of the communications network based at least on the geographic location data of the control plane signaling data; determine key performance indicators of the plurality of video sessions within the cell based on the correlated video session data and control plane signaling data; and provide, to a communications network provider associated with the communications network, the determined key performance indicators, wherein the communications network provider reorganizes the communications network according to the determined key performance indicators to provide improved communications network performance.

These and other aspects and implementations are discussed in detail below. The foregoing information and the following detailed description include illustrative examples of various aspects and implementations and provide an overview or framework for understanding the nature and character of the claimed aspects and implementations. The drawings provide illustration and a further understanding of the various aspects and implementations and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 2 is a diagram illustrating matching data from a control signal dataset with data of a video session dataset, in accordance with an implementation;

DETAILED DESCRIPTION

Figure 1:
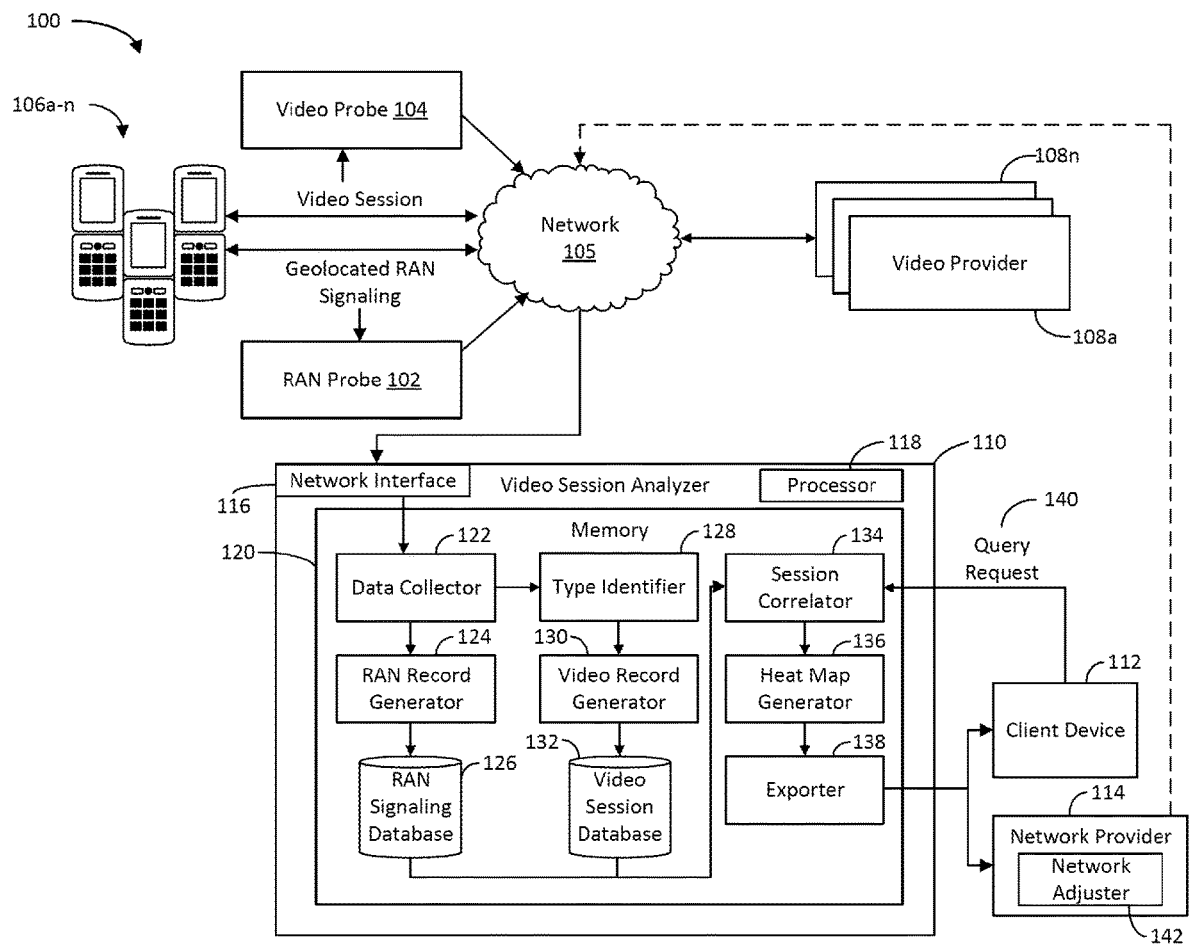
FIG. 1 is an illustration of a system for improved communications network performance, in accordance with an implementation.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

As previously mentioned, due to video providers often attempting to provide their customers with high definition quality videos, cellular service provider Radio Access Network (RAN) departments are concerned with determining how to configure their RAN cell design and subtending parameters to support the resulting video traffic. Moreover, a communications network provider may wish to adjust the support they provide (e.g., how they allocate radio network resources) to individual video providers to optimize the quality of service of videos that video providers stream to client devices (e.g., mobile phones, laptops, computers, etc.) across a communications network.

Historically, RAN networks, as defined in 3GPP standards, are managed and optimized using Assess Stratum (AS) signaling using radio resource connection procedures (RRC) and their information elements. Monitoring services of the RAN departments can identify busy and congested cells by analyzing RRC signaling (MAC PHY bandwidth, #RRC/second, etc.). RAN departments may not know what the user plane or application is running on top of the AS radio bearers that are streaming videos in video sessions to various client devices because data from the video service user plane is only available from the core network and is separate from any RAN signaling. Moreover, any attempts to retrieve user plane data from the RAN would be expensive and would be difficult to implement at scale. Accordingly, many operators only have access to Assess Stratum signaling.

In some instances, RAN departments can obtain only high-level core network insights as to what user plane applications and quality of service are being used using probing techniques or infrastructure performance management data such as counters. The best granularity such RAN departments may have is data identifying a cell site or an evolved NodeB (eNB) of a subtending cell. While this may be useful information to know, such information may not be sufficient to optimize the cell for growing video services.

RAN signaling may contain radio environment information which allows RAN analysis tools to provide an estimate of the geolocation of user equipment (UE) engaged in a radio session (RRC Connections or calls) with a base station. Such geolocation information, when associated with individual radio sessions, can be used to compile geographic heat maps of any radio attributes collected by the RAN tools.

For example, an important aspect of RAN optimization is that it may take much more cell radio resource capacity to provide service to a user equipment that is served by a poor radio link (low channel quality indicator (CQI)) compared to a good link. In general, delivering the same data rate and quality of service to a UE at a cell edge with low CQI may consume 10 to 30 times the radio resources compared to delivering the same service to a UE close to a cell site with a high-quality radio link. Since video delivery usually involves significant data volume, delivery of video under cell edge or poor CQI conditions is particularly draining on the serving cell radio resources.

Accordingly, it is desirable to understand video quality of service (QoS) indicators or key performance indicators and the video providers that provide video sessions in accordance with the video QoS indicators across a communications network to UE within each cell of the communication network. A communications network provider managing the communications network may use "sub-cell" information including the QoS indicators to optimize the communications network when streaming the videos across the communications network to areas within the cell.

Implementations of the systems and methods discussed herein provide for a monitoring process that enables a remote server to correlate data from different planes of a network architecture and generate an output that a network provider may use to optimize video playback (and other network communications) across its network (e.g., self-organizing network). The improvements may enable the remote server to geolocate video user plane data within sub-cells of a cell by matching video user plane data with corresponding control signal data and identifying the geolocation of the video user plane data based on the geolocation of the matched control signal data. The remote server may generate heat maps of the data that corresponds to key performance indicators of the video user plane data within a set time period. In some cases, the improvements enable the remote server to identify sources of streamed video that is causing undue strain on the networking environment and generate heat maps based on the identified sources. The remote server may provide the generated heat maps to the network provider, enabling the network provider to feed the heat map and/or the correlated data into its network. Because the network may be a self-organizing network, the network may identify the heat map and/or the correlated data and automatically adjust how it streams videos to client devices based on the heat map or correlated data. For example, a self-organizing network (SON) may adjust its configuration to stream videos with lower latency and/or with higher video quality by reducing the video resolution of videos that are provided by a video provider that is using a disproportionate amount of network resources.

Implementations not utilizing the systems and methods described herein lack the ability to obtain a granular sub-cell view of video streaming across a network or determine which video providers are causing undue strain on the networking environment. Any data related to video streaming may only be obtained at a cell level, which may not be sufficient to optimize video streaming for growing video services. However, by implementing the systems and methods described herein, a remote server may not only identify areas of a cell that are utilizing a disproportionate amount of resources but may also accurately determine any video providers that are causing such disproportionate use.

FIG. 1 illustrates an example system 100 to provide improved communications network performance, in some embodiments. In brief overview, the system 100 can include a RAN probe 102 and a video probe 104 that receive and/or store data packets transmitted via a network 105 between client devices 106a-n (hereinafter client device 106 or client devices 106) and video providers 108a-n (hereinafter video provider 108 or video providers 108). The video providers 108 can each include a set of one or more servers 502, depicted in FIG. 5A, or a data center 508. System 100 can also include a video session analyzer 110 that can communicate or interface with RAN probe 102, video probe 104, a client device 112, and/or a network provider 114, either directly or via network 105, to optimize the provision of video to client devices 106 across network 105. Video session analyzer 110 can collect data from RAN probe 102 and/or video probe 104 and generate a heat map illustrating geolocated key performance indicators (KPIs) of videos session that video providers 108 streamed to client devices 106. Video session analyzer 110 can display the heat map at client device 112 and/or transmit the heat maps to network provider 114. Network provider 114 may receive the heat map and adjust how videos are transmitted across network 105 for lower latency playback according to the heat map as described in further detail below.

RAN probe 102, video probe 104, client devices 106, video providers 108, video session analyzer 110, client device 112, and/or network provider 114 can include or execute on one or more processors or computing devices (e.g., computing device 503 depicted in FIG. 5C) and/or communicate via network 105. Network 105 can include computer networks such as the Internet, local, wide, metro, or other area networks, intranets, satellite networks, and other communication networks such as voice or data mobile telephone networks. Network 105 can be used to access information resources such as web pages, web sites, domain names, or uniform resource locators that can be presented, output, rendered, or displayed on at least one computing device (e.g., client device 106), such as a laptop, desktop, tablet, personal digital assistant, smart phone, portable computers, or speaker. For example, via network 105, client devices 106 can stream videos in video sessions provided by video providers 108. In some embodiments, network 105 may be or include a self-organizing network that implements a machine learning model to automatically adjust connections and configurations of network elements of network 105 to optimize network connections (e.g., minimize latency, reduce dropped calls, increase data rate, increase quality of service, etc.).

Each of RAN probe 102, video probe 104, client devices 106, video providers 108, video session analyzer 110, client device 112, and/or network provider 114 can include or utilize at least one processing unit or other logic device such as programmable logic array engine, or module configured to communicate with one another or other resources or databases. The components of RAN probe 102, video probe 104, client devices 106, video providers 108, video session analyzer 110, client device 112, and/or network provider 114 can be separate components or a single component. System 100 and its components can include hardware elements, such as one or more processors, logic devices, or circuits.

Still referring to FIG. 1, and in further detail, system 100 can include video providers 108. Video providers 108 may each be configured to transmit or stream videos in video sessions across network 105 to client devices 106 upon receiving requests for such videos from any of client devices 106. Each video provider 108 may be associated with a different type of video application (not shown) that can be stored or executed on client devices 106 to play videos that are streamed from the respective video provider 108. As described herein, a video may be a movie, television show, music video, or any other audiovisual or visual content that video providers 108 can stream to client devices 106. A video session may be or include the streaming or playback of a video that a video provider 108 streams across network 105.

Client devices 106 can include or execute video applications to play videos on displays of client devices 106. For example, a client device 106 may execute a video application upon receiving a user input selection that causes the client device 106 to open the video application on the display. Responsive to executing the video application, the client device 106 may display a catalog or list of videos that a video provider 108 that corresponds to the executed video application can stream to the client device 106 across network 105. The client device 106 may receive a user input selection of a video from the catalog or list of videos and transmit a request for the selected video to the video provider 108. The video provider 108 may then stream the requested video to the client device 106 as a video session and the client device 106 may download or store (e.g., in a database of client device 106) the requested video for later playback or play the video as the video provider 108 streams the video.

A client device 106 can be located or deployed at any geographic location in the network environment depicted in FIG. 1. A client device 106 can be deployed, for example, at a geographic location where a typical user using the client device 106 would seek to stream videos. For example, a user can use a client device 106 to stream videos at home, as a passenger in a car, while riding a bus, in the park, at work, while eating at a restaurant, or in any other environment. The client device 106 can be deployed at a separate site, such as an availability zone managed by a public cloud provider (e.g., cloud 510 depicted in FIG. 5B). If the client device 106 is deployed in a cloud 510, the client device 106 can include or be referred to as a virtual client device or virtual machine. In the event client device 106 is deployed in a cloud 510, the packets exchanged between the client device 106 and video providers 108 can still be retrieved by RAN probe 102 and video probe 104 from network 105. Client device 112 may be similar to client devices 106. In some cases, the client device 106, RAN probe 102, video probe 104, and/or video session analyzer 110 can be deployed in cloud 510 on the same computing host in an infrastructure 516 (described below with respect to FIG. 5).

As video providers 108 stream videos in video sessions to client devices 106, RAN probe 102 may intercept or otherwise monitor the control plane signaling data of the streamed videos. RAN probe 102 may comprise one or more processors that are connected to a network equipment manufacture (NEM) trace port of network 105. In some embodiments, RAN probe 102 may collect control plane signaling data at an Evolved Packet Core interface (e.g., the S1-MME interface or the S6a interface) of network 105. The control plane signaling data may include geographical location data (e.g., cell tower triangulation data or global positioning system data) of the client devices 106 as client devices 106 receive video, a cell identifier identifying the cell in which the respective client device 106 was located while streaming video, a device identifier (e.g., IMSI, MAC address, IP address, etc.) of the client device 106, dropped calls (e.g., disconnects from the streaming video provider), MAC PHY bandwidth, number of resource connection procedures a second, reference signals received power (RSRP), reference signal received quality (RSRQ), carrier to interference and noise ratio (CINR), handover information, timestamps indicating when the data was collected or generated, etc. RAN probe 102 may receive such data and forward the data to video session analyzer 110 over network 105 for further processing.

Similarly, as video providers 108 stream the videos in video sessions to client devices 106, video probe 104 may collect user plane data of the video sessions that video providers 108 stream across network 105 to client devices 106. Video probe 104 may comprise one or more processors that are connected to a core interface (e.g., a S1-U logical interface) of network 105 to collect such user plane data. For example, video probe 104 may be connected to an eNodeB of network 105 via an eNodeB trace port to monitor eUTRAN signaling information. The user plane data may include identifiers (e.g., IMSIs, IP addresses, IMEI, etc.) of the client devices accessing the network, Cell-ID, MME-Ue-S1AP-ID, eNB-UE-S1AP-ID, and/or eUTRAN Contents data. In some instances, the user plane data may include quality of service (QoS) data. QoS is also sometimes referred to as Quality of Experience (QoE). In some embodiments, video probe 104 may calculate a Mean Opinion Score (MOS) of the video service. Video probe 104 may receive or collect such user plane signaling data and transmit the user plane data to video session analyzer 110 for further processing.

Video session analyzer 110 may comprise one or more processors that are configured to receive control plane signaling data and user plane data (e.g., video session data), correlate corresponding data, generate a heat map illustrating the correlated data, and export the heat map to network provider 114 to improve network performance of network 105. Video session analyzer 110 may comprise a network interface 116, a processor 118, and/or memory 120. Video session analyzer 110 may communicate with any of RAN probe 102, video probe 104, client devices 106, video providers 108, client device 112, and/or network provider 114 via network interface 116. Processor 118 may be or include an ASIC, one or more FPGAs, a DSP, circuits containing one or more processing components, circuitry for supporting a microprocessor, a group of processing components, or other suitable electronic processing components. In some embodiments, processor 118 may execute computer code or modules (e.g., executable code, object code, source code, script code, machine code, etc.) stored in memory 120 to facilitate the activities described herein. Memory 120 may be any volatile or non-volatile computer-readable storage medium capable of storing data or computer code.

Memory 120 may include a data collector 122, a RAN record generator 124, a RAN signaling database 126, a type identifier 128, a video record generator 130, a video session database 132, a session correlator 134, a heat map generator 136, and an exporter 138, in some embodiments. In brief overview, components 122-138 may cooperate to ingest control signaling data and video session data, correlate the data together based on common timestamps and/or common device identifiers, and generate heat maps for cells based on the correlated data. Components 122-138 may generate the heat maps and transmit the heat maps or the correlated data of the heat maps to client device 112 for display. In some embodiments, the components 122-138 may transmit the heat maps or the data of the heat maps to network provider 114 and network provider 114 may use the data to optimize network 105 (e.g., reduce latency by dropping connections to client devices 106 at the edge of the cell, adjust video signal transmission, etc.).

Data collector 122 may comprise programmable instructions that, upon execution, cause processor 118 to receive or collect data from RAN probe 102 and/or video probe 104. Data collector 122 may collect control plane signaling data from RAN probe 102 and/or user plane data from video probe 104. Data collector 122 may collect data by polling or receiving data from probes 102 and 104. Data collector 122 may poll or receive data from probes 102 and/or 104 at set intervals or pseudo-randomly. Upon receiving such data, data collector 122 may identify a data type (e.g., control signaling data or user plane data) of the data by identifying the source of the data or identifying values of the data and transmit the data to RAN record generator 124 or type identifier 128 based on the identified type. For example, responsive to determining data originated at RAN probe 102 or that the data is otherwise control signaling data, data collector 122 may transmit the data to RAN record generator 124. Responsive to determining data originated at video probe 104 or that the data is otherwise user plane data, data collector 122 may transmit the data to type identifier 128.

Responsive to RAN record generator 124 receiving data from data collector 122, RAN record generator 124 may analyze, geolocate, aggregate, and store control signaling data as a record (e.g., a call table record) in RAN signaling database 126. RAN record generator 124 may analyze and geolocate the data by identifying the location data (e.g., GPS data or cell tower triangulation data) associated with the data and identifying the latitude and/or longitude associated with the location data. Such a latitude and longitude may be the general location of a client device 106 that was accessing the network 105 while streaming videos from video providers 108. RAN record generator 124 may generate records for the control signaling data that includes the location data, a cell identifier, timestamp, and/or a client device identifier for storage in RAN signaling database 126.

RAN record generator 124 may aggregate control signaling data into records that have a fixed size (e.g., length of time). For example, RAN record generator 124 may be configured to generate records that are five minutes long. RAN record generator 124 may identify sequential timestamps of control signaling data that correspond to the same device identifier for five minutes and generate a record with the identified data. RAN record generator 124 may be configured to generate records that have any size. Such records may comprise rows that each correspond to individual timestamps of the data within the time period of the record.

Because RAN record generator 124 may be configured to generate records of a fixed size and videos may have variable sizes, RAN record generator 124 may be configured to generate multiple records for videos that are longer than the fixed size or buffer records that are shorter than the fixed size. For example, a client device 106 may stream a movie that is 90 minutes long from a video provider 108. RAN record generator 124 may be configured to generate 'periodic' records for control signaling data that are 10 minutes long. RAN record generator 124 may receive the data from the movie stream and generate nine different records with data corresponding to the movie stream. In another example, a client device 106 may stream a video that is three minutes long, and RAN record generator 124 may be configured to generate records that are five minutes long. RAN record generator 124 may identify the ending of the video and generate a record for the three minutes of data but with null values representing data of the last two minutes. RAN record generator 124 may generate records that have any length. RAN record generator 124 may store such records in RAN signaling database 126.

In some cases, RAN record generator 124 may generate records for control signaling data as user equipment travels between cells (e.g., as a user is traveling watching a video). RAN record generator 124 may identify the changing location of the user equipment from the control signaling data (e.g., via the Cell-IDs). Responsive to identifying a change in cells (e.g., identifying a change in Cell-ID), RAN record generator 124 may instantiate a new record for the control signaling data, filling out the remainder of the record associated with the previous cell with null values. RAN record generator 124 may generate the new record as a continuation of the data associated with the previous cell.

Similarly, in some embodiments, RAN record generator 124 may generate new records for control signaling data as user equipment travels between sub-cells of a cell. RAN record generator 124 may compare the locations to a table identifying sub-cell information and generate records for the times the user equipment accesses network 150 was in the respective sub-cell. The records may include identifiers of the respective sub-cell for indexing and faster data retrieval.

RAN signaling database 126 may be a dynamic database that includes records of control signaling data received from RAN probe 102. RAN signaling database 126 can be a graph database, MySQL, Oracle, Microsoft SQL, PostgreSql, DB2, document store, search engine, key-value store, etc. RAN signaling database 126 may be configured to hold any amount of data and can be made up of any number of components. RAN signaling database 126 may index the records based on the respective cell identifiers, timestamps, and/or client device identifiers, enabling processor 118 to quickly retrieve and/or organize the data within RAN signaling database 126. Upon receiving a query request comprising one or more of a time period, cell ID, or client device identifier, processor 118 may query RAN signaling database 126 and identify the data that corresponds to the user input based on the indexing scheme for processing (e.g., to generate a heat map, correlate the control signaling data with video session data, etc.).

Referring still to FIG. 1, responsive to data collector 122 identifying received data as user plane data, data collector 122 may transmit the data to type identifier 128. Type identifier 128 may be or comprise executable instructions that, upon execution by processor 118, may determine whether the user plane data is video session data and/or a category of the video session data (e.g., which video provider 108 transmitted the video of the videos session). Type identifier 128 may determine whether received user plane data is video session data by ciphering the data packets of the user plane data and identifying characteristics of the data packets. Type identifier 128 can often identify if user plane data is composed of video stream data even if the user plane data is ciphered by identifying the characteristics of the ciphered data. Type identifier 128 may compare the characteristics to characteristics stored in a database (not shown) and identify a data type (e.g., email, video, webpage, picture, etc.) that corresponds to the matching characteristics. For example, type identifier 128 may identify values from the header and/or payload of data packets of received user plane data and compare the values to values in a database that correspond to different data types. Type identifier 128 may identify matching values and determine the data has a data type that corresponds (e.g., has a relationship with) to the matching values within the database. Type identifier 128 may identify video data packets as data packets with characteristics that match the video type.

In some embodiments, responsive to determining the data packets contain video session data, type identifier 128 may determine the source of the video session data using deep packet inspection. Type identifier 128 may determine the source, for example, by identifying patterns of synchronization signals of the streamed video session data that enable video providers to synchronize with client devices 106. For example, while transmitting video session data to client devices 106, different video providers 108 may send synchronization signals at different time slots of subframes within a radio frame. For instance, one video provider 108 may send synchronization signals in the first time slot of each subframe of a frame while another video provider 108 may send synchronization signals in the first time slot of every other subframe of a frame. Video providers 108 may transmit synchronization signals in any pattern. Type identifier 128 may analyze the video session data and identify patterns of synchronization signals by identifying the synchronization signals within a preset time window or number of radio frames (e.g., a 10 ms radio frame). Type identifier 128 may compare an identified pattern to a database which stores pattern-application type pairs to identify a pattern-application type pair with a matching pattern. Type identifier 128 may identify a matching pattern of a pattern-application type pair and identify the corresponding application type of the pattern-application type pair. Type identifier 128 may identify the video provider that is associated with the identified application type as being the source of the video session data. In some embodiments, type identifier 128 may compare an identified pattern to a pattern-video provider pair that includes patterns and corresponding video providers. Responsive to identifying a match between an identified pattern and a pattern-video provider pair, type identifier 128 may identify the video provider of the pattern-video provider pair as the source of the video session data associated with the pattern. Accordingly, type identifier 128 can identify the source or video provider 108 that provided video session data for particular video sessions.

Video record generator 130 may be or comprise executable instructions that, upon execution by processor 118, may generate video records from video session data that was identified by type identifier 128. Video records may comprise video session data of video sessions or videos that are streamed across network 105 to client devices 106 and, in some cases, the sources of such video session data (e.g., the video provider 108 that provided the video session data of a video session). To generate video records, video record generator 130 may identify temporally sequential data packets of video session data that are associated with or that have matching device identifiers. Video record generator 130 may generate video records with the data of the sequential data packets. Video record generator 130 may identify the end of a video or a video session when video record generator 130 is not able to identify another sequential data packet that corresponds to the device identifier associated with the video session.

Depending on its configuration, video record generator 130 may generate video records for video sessions that correspond to data of entire videos or to data that falls into time windows of a set size (e.g., a predetermined time window). If video record generator 130 is configured to generate video records for entire videos, video record generator 130 may identify the end of the video (e.g., the data associated with the last sequential timestamp with associated with the same device identifier) and generate the video records with the data of the sequential data packets until the end of the video. However, if video record generator 130 is configured to generate video records for time windows of a set size, video record generator 130 may identify the video session data that is associated with timestamps within the respective time window and generate a video record of the data that falls within the respective time window. Similar to RAN record generator 124, video record generator 130 may generate multiple video records that correspond to playback or streaming of one video or may buffer a video record with null values if the video is smaller than the set size. Upon generating the video records, video record generator 130 may store the video records in video session database 132. In some embodiments, video record generator 130 may generate video records based on the geographical location of user equipment as the user equipment travels between cells and/or sub-cells and handles handovers similar to how RAN record generator 124 generates records of control signaling data as user equipment travels.

Similar to RAN signaling database 126, video session database 132 may be a dynamic database that includes records of control signaling data received from video probe 104. Video session database 132 can be a graph database, MySQL, Oracle, Microsoft SQL, PostgreSql, DB2, document store, search engine, key-value store, etc. Video session database 132 may be configured to hold any amount of data and can be made up of any number of components. Video session database 132 may index and store video records based on device identifiers and/or timestamp information of the video records. In some embodiments, video session database 132 may be configured to store data about different video providers 108.

Session correlator 134 may be or comprise executable instructions that, upon execution by processor 118, may correlate video session data of video session database 132 with control signaling data of RAN signaling database 126. Session correlator 134 may correlate video session data responsive to receiving query requests from client devices and/or at set time intervals. For example, session correlator 134 may receive a query request 140 from client device 112 for a heat map of key performance indicators for a geographical cell during a previous time period. Session correlator 134 may receive the request and retrieve data from RAN signaling database 126 and video session database 132 that is associated with the geographical cell (e.g., is associated with a Cell-ID of the cell) and the previous time period. Session correlator 134 may compare the retrieved data and identify RAN signaling data that matches video session data based on data having matching timestamps and device identifiers. Session correlator 134 may determine the data is correlated responsive to identifying the match and tag or label the data as being correlated. Session correlator 134 may transmit the correlated data to heat map generator 136 to generate the requested heat map.

In some embodiments, session correlator 134 may receive a query request 140 automatically at set intervals. Such may be the case when network provider 114 uses correlated data to fine tune network 105 over time. At each interval, session correlator 134 may correlate data for individual cells and provide the correlated data to heat map generator 136 to determine KPIs and/or generate a heat map for export to network provider 114. In some cases, session correlator 134 may provide the correlated data to exporter 138 for export. Consequently, network provider 114 may continuously adjust network 105 without waiting for video session analyzer 110 to identify an issue or a user to manually make a request.

In some embodiments, session correlator 134 may correlate the data responsive to video session analyzer 110 identifying an issue or responsive to receiving a report of an issue. Consequently, video session analyzer 110 and/or network provider 114 may automatically identify and/or adjust network 105 to resolve the issue to minimize the issue's effects.

Advantageously, by correlating the control signaling data and the video session data, session correlator 134 may be able to geolocate the areas that client devices 106 streamed videos provided by video provider 108. The correlated data may include identifiers of the video providers 108 that streamed the video session data along with KPIs indicating the quality of such streaming. Consequently, the correlated data may indicate areas in which individual video providers 108 streamed the most video session data (e.g., areas where individual video providers 108 are requiring the largest amount of network resources) and the quality of such streaming in these different areas during a time period (e.g., a time period specified in a request).

Heat map generator 136 may be or comprise executable instructions that, upon execution by processor 118, may generate heat maps using the correlated data that is provided by session correlator 134. Heat map generator 136 may generate the heat maps for individual cells for which network provider 114 provides telecommunication coverage (e.g., cells that have base stations that enable client devices 106 to access network 105 to receive video content from video providers 108). A heat map for a cell may be further divided into sub-cells or bins that make up the cell. Heat map generator 136 may generate the heat map by identifying the geographic location of correlated video session data and the sub-cell or bin that corresponds to the geographic location. Upon identifying the sub-cell or bin, heat map generator 136 may aggregate the KPIs of video session data associated with the sub-cell or bin during a respective time period and overlay the sub-cell or bin based on the values of the KPIs.

Heat map generator 136 may overlay the sub-cells or bins based on the values of individual KPIs using a stored coloring scheme. For example, heat map generator 136 may store a sliding color scale (red is bad, yellow is average, green is good) that represents the colors that correspond to various average values of individual KPIs. Heat map generator 136 may aggregate and/or average the values of individual KPIs over a time period (e.g., a time period of a query request) for a sub-cell or bin and compare the average value to the color scale. Responsive to a value matching a color, heat map generator 136 may identify the matching color and overlay the corresponding sub-cell or bin with the color. Heat map generator 136 may identify average values of KPIs for any number of sub-cells of a cell, thereby creating a heat map. Heat map generator 136 may generate the heat map to be dynamic so a user can select different KPIs for which heat map generator 136 can display the colored sub-cells or bins. For example, heat map generator 136 may generate a heat map of a cell to display KPIs such as number of video calls, mean/average call duration, a histogram of video calls, volume of video data transmitted, cell PRB (physical resources blocks) resources consumed in delivering the video, etc. Other examples of KPIs may be related to video quality such as min/max/average/mean and distribution of video mean opinion score (MOS), video drops, retransmissions, etc.

For example, heat map generator 136 may generate a heat map for a cell responsive to a request from client device 112. The request may include a cell identifier of a cell and/or an identifier of a KPI for latency of video connections within the cell for the previous day. Heat map generator 136 may receive correlated control signaling data and video session data from session correlator 134 for the previous day and identify the sub-cells of the cell that correspond to the correlated data. Heat map generator 136 may identify the latency indicators from the video session data of the correlated data and overlay the individual sub-cells of the heat map with colors according to the latency indicators. Accordingly, a user may easily view the latency for different sub-cells and/or groups of sub-cells for which network 105 provides video session data.

In some embodiments, heat map generator 136 may generate heat maps that can be filtered based on one (or more) IMSI or handset type (which heat map generator 136 may determine via IMEIs of the respective devices) Such heat maps may be simultaneously filtered to illustrate underlying RF conditions (e.g., RSRP, RSRQ, SINR, etc.) of video sessions, enabling users to get a holistic view of RF conditions across different devices or handset types and/or so network providers can narrow down the cause of any network faults or issues.

Exporter 138 may be or comprise executable instructions that, upon execution by processor 118, may export generated heat maps and/or correlated data to client device 112 or network provider 114. For example, exporter 138 may create an exportable file (e.g., a file with a format such as BIL, GRD/TAB, PNG, ASKII, KMZ, etc.) from the generated heat maps (e.g., the heat map itself and/or the geolocated KPIs of the heat map) and/or correlated data and transmit the exportable file to client device 112 for display or network provider 114 to adjust network 105. Exporter 138 may transmit the exportable file to client device 112 or network provider 114 responsive to a request from client device 112. In some embodiments, session correlator 134, heat map generator 136, and/or exporter 138 may cooperate to generate and/or export a heat map or correlated data as exportable files to network provider 114 at set intervals so network provider 114 may continuously adjust the configuration of network 105 for optimized video streaming and/or network performance.

In some embodiments, as described herein, in addition to or instead of generating and/or exporting heat maps, exporter 138 may export correlated control signaling data and video user plane data itself using an API. Exporter 138 may export such data responsive to identifying an anomaly (e.g., identifying KPI values that exceed a threshold such as a video provider that uses excessive radio resources) or a constant stream of correlated data. In cases in which exporter 138 identifies an anomaly, exporter 138 may identify relevant data records (e.g., the data records that are associated with the anomalous data) and export the data records to client device 112 and/or network provider 114 for display and/or for further processing (e.g., to optimize network 105). Exporter 138 may similarly constantly stream data to client device 112 and/or network provider 114 for display and/or processing.

In some embodiments, exporter 138 may export KPIs that heat map generator 136 determines for the cell. Heat map generator 136 may determine KPIs for individual video providers 108, handset types, etc. Exporter 138 may encapsulate the KPIs into data packets and transmit the data packets to network provider 114 for processing (e.g., to use as an input into the self-organizing network of network 105). In some embodiments, network provider 114 determines the KPIs itself based on the correlated data.

Network adjuster 142 may comprise executable instructions stored in a memory (not shown) of network provider 114 that, upon execution by a processor (not shown) of network provider 114, adjusts the configuration of network elements of network 105 and how network 105 streams video. Network adjuster 142 may receive the exported heat map and/or the corresponding correlated data and feed the heat map and/or correlated data into a machine learning model (e.g., a neural network, random forest, a support vector machine, etc.) (not shown) associated with managing network 105. For example, the machine learning model may provide an output (e.g., new configurations for network elements of network 105) that causes network adjuster 142 to adjust the configurations of the network elements of network 105 to adjust the video resolutions and/or data rate with which video session data is streamed. In another example, based on an output of the machine learning model, network adjuster 142 may adjust network 105 to provide lower latency video playback by minimizing the resolution of streamed videos and/or dropping any client devices that are requiring an amount of network resources above a threshold to stream video (e.g., client devices that streaming video at the edge of the cell). In some embodiments, the machine learning model may provide an output that causes network adjuster 142 to adjust characteristics of video streaming across network 105 based on the video provider 108 for which the video session data is streamed. For example, the machine learning model may determine that a video provider 108 is taking up too much bandwidth streaming high quality videos and accordingly network adjuster 142 may reduce the video resolution of videos streamed by the video provider 108 to free up bandwidth for other video providers, thereby reducing latency streamed across video providers 108. Network adjuster 142 may feed data into the machine learning model to adjust network 105 in any manner.

In some embodiments, video session analyzer 110 may use the generated heat map to determine the root cause of an overburdened communications network. To do so, video session analyzer 110 may execute heat map generator 136 to generate a heat map according to a set of rules. The set of rules may be inputs in a request from a client device that indicates the data for heat map generator 136 to use to generate a heat map. For example, video session analyzer 110 may receive a request to generate a heat map for a time period based on control plane data with channel quality indicators that are less than or equal to 4 and that has a data volume that is greater than or equal to 100 MB, and based on video user plane data for a particular video provider 108 or application type. Requests may include any sets of rules for control plane and/or video user plane data. Session correlator 134 may correlate the data from within the time period and heat map generator 136 may display the key performance indicators for correlated data that satisfies each of the rules of the request. Advantageously, in some instances, such rules may correspond to streamed video sessions that consume a disproportionate amount of radio frequency resources. By generating a heat map that illustrates the client devices that are streaming data according to these rules, video session analyzer 110 may show the locations of client devices that stream high resource requirement video sessions on the heat map. Video session analyzer 110 may send the generated heat map to network provider 114 for network optimization and/or to client device 112 so an administrator can tune network 105 (e.g., cause network 105 to drop any calls from client devices 106 streaming resource intensive videos, adjust video resolution, adjust data rate, etc.).

FIG. 2 is a diagram 200 illustrating matching data of a control signal dataset 202 with data of a video session dataset 204, in accordance with an implementation. Control signal dataset may represent a dataset of records (e.g., RRC records) of RAN signaling database 126. Video session dataset 204 may represent a dataset of video records of video session database 132. As illustrated, control signal dataset 202 may include rows for records of control signaling data. While each record is shown to only include one row of data, a record may include multiple rows of data that corresponds to data with sequential timestamps and matching IMSIs (or another device identifier) for a time period of the record. A record of control signaling data may include a cell identifier 206, a timestamp 208, an IMSI 210 (or another device identifier), a latitude 212, and/or a longitude 214. Records may include any amount of control signaling data. Cell identifiers 206 may indicate the geographical cell a client device was in when the client device sent data requests across a network and/or when the client device received the data. Timestamps 208 may indicate the times that such requests were sent or when the client device received data. IMSI 210 may indicate the IMSI of the respective client device. Latitude 212 and longitude 214 may indicate the geographic location of the client device when it transmitted a request or received the data.

Video session dataset 204 may represent a dataset of video records for video sessions of client devices streaming videos across a network. While each record is shown to only include one row of data, a video session record may include multiple rows of data that corresponds to data with sequential timestamps and matching IMSIs (or another device identifier such as IMEI) for a time period of the record. A video session record may include a session ID 216, a timestamp 218, an IMSI 220 (or another device identifier), an application type 222, and/or session parameters 224. Session IDs 216 may be identifiers of individual video records that are stored in video session database 132. Timestamps 218 may indicate times that the video session data of the video session was streamed to the respective client device. IMSI 220 may indicate the IMSI of the client device. Application type 222 may indicate the video provider that streamed the video of the respective video session. As illustrated, the application type may be a numerical value. However, application type may any symbol or string that represents different video providers. Session parameters 224 may indicate different performance characteristics of the video session such as KPIs for quality of experience indicators or quality of service indicators (e.g., bandwidth, latency, jitter, error rate, etc.), video resolution, etc.

A data processing system (e.g., video session analyzer 110) may compare control signal dataset 202 to video session dataset 204 (e.g., compare the records of the two datasets) to identify if any of the records of the datasets 202 and 204 match. The data processing system may match records of the datasets 202 and 204 based on timestamps and IMSI values (or another device identifier) of corresponding records being identical or the IMSI values being identical and the timestamps falling within a predetermined range of each other. For example, the data processing system may match the first row of control signal dataset 202 with the second row of video session dataset 204 responsive to determining they both have timestamps of 5:00 and IMSIs of 516115115154685. The data processing system may similarly match the fourth row of the two datasets 202 and 204. The data processing system may match any number of records between the datasets 202 and 204 and correlate the matched records by tagging them to indicate the match.

Figure 3:
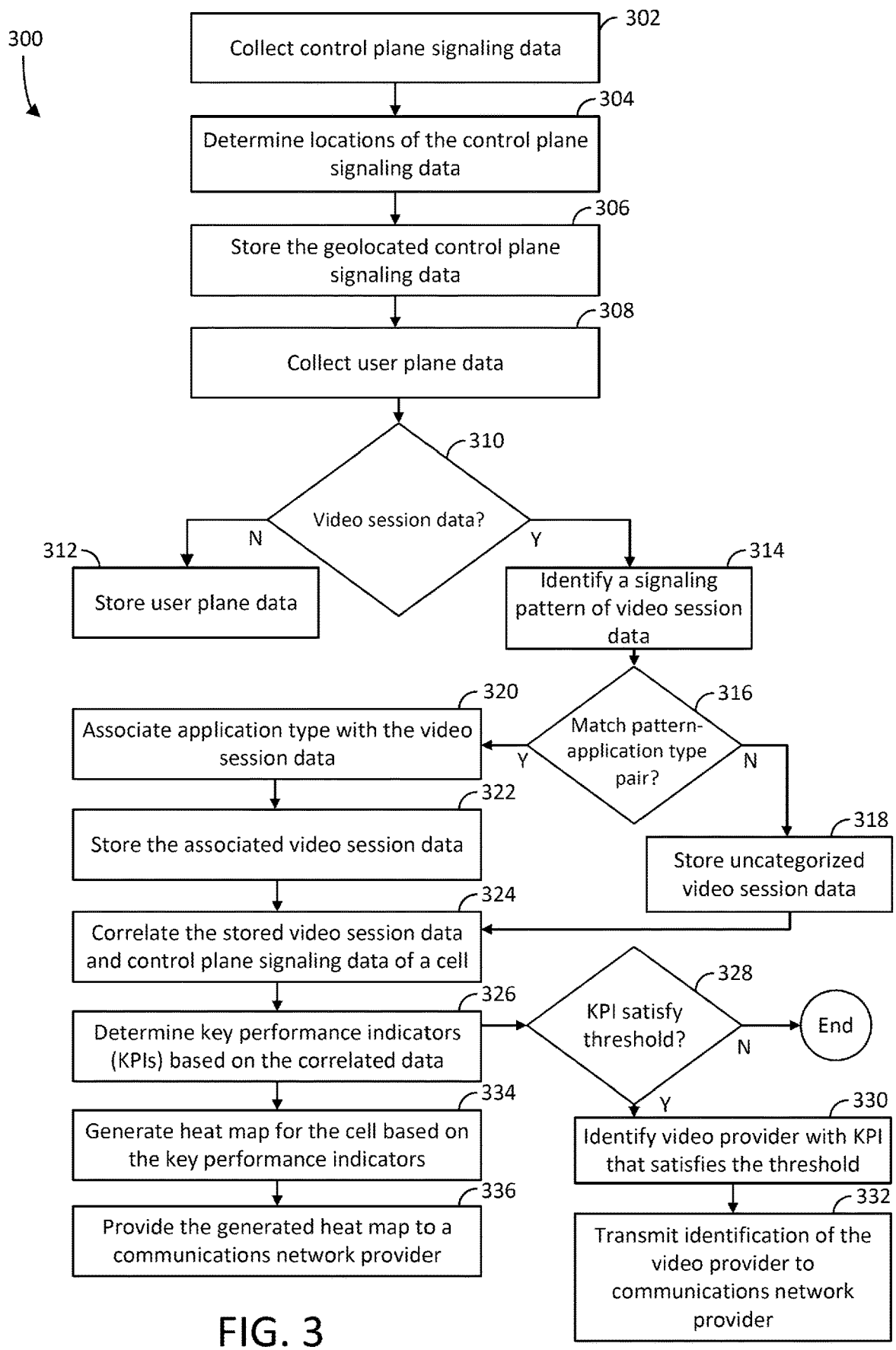
FIG. 3 is an illustration of a method for improved communications network performance, in accordance with an implementation.

FIG. 3 is an illustration of a method 300 for improved communications network performance, in accordance with an implementation. Method 300 can be performed by a data processing system (a client device, a probe, video session analyzer 110, shown and described reference to FIG. 1, a server system, etc.). Method 300 may include more or fewer operations and the operations may be performed in any order. Performance of method 300 may enable the data processing system to correlate video session data with control plane data to determine key performance indicators (KPIs) of video sessions of different video providers within a cell of a communications network (e.g., self-organizing network) and generate a heat map for the cell based on the KPIs. The data processing system may then improve on the determined KPIs for further video sessions by providing the heat map or the correlated data to a network provider of the communications network. The network provider can feed the data into a machine learning model of the communications network. The machine learning model may produce an output that causes the network provider to adjust how the communications network streams videos across the communications network to minimize latency and/or otherwise improve the quality of such streaming.

At operation 302, the data processing system may collect control plane signaling data. Control plane signaling data may include data packets that include data that is transmitted across a network between client devices and various servers such as video providers. The data packets may each include a device identifier (e.g., an international mobile subscriber identity identifier), a timestamp indicating the time with which the data is associated or generated or the packet is transmitted, a cell identifier, and/or geographic location data of the client device that is transmitting requests and receiving data in response to such requests. In some embodiments, the geographic location data may include longitude and latitude coordinates of the requesting client device (e.g., such as when the client device provides global positioning system data). In some embodiments, the geographic location data may include signal strengths of the signals between the client device and a transceiver antenna or a tower and base station with which the client device transmits signals to make requests and receive the data packets.

The data processing system may collect the control plane signaling data from a control signaling data probe that is configured to receive or collect the control plane signaling data. Such a control signaling probe may collect the control plane signaling data from a network equipment manufacturer (NEM) trace port. In some embodiments, the control signaling probe may collect control plane signaling data at an Evolved Packet Core interface (e.g., the S1-MME interface or the S6a interface) of the network.

At operation 304, the data processing system may determine locations of the control plane signaling data. In embodiments in which the data packets include the longitude and/or latitude of the client device, the data processing system may determine the locations of the control plane signaling data by identifying the longitude and/or latitude from the data packets. In embodiments in which the data packets include signal strength data, the data processing system may use triangulation techniques that are well known in the art to determine the geographic location of the client device when it transmits requests for data and/or receives data across the communications network.

At operation 306, the data processing system may store the geolocated control plane signaling data. The data processing system may store the geolocated control plane signaling data in a database of the data processing system. In some embodiments, the database may be dedicated to control plane signaling data or otherwise only include control plane signaling data. The data processing system may store the geolocated control plane signaling data as a record having a start time and an end time indicating a time period in which a client device requested and received data packets across the control plane of the network. The record may include control plane signaling data (e.g., timestamp, IMSI, cell identifier (Cell-ID), etc.) that was collected from the control signaling probe and the geolocation data of the client device indicating the determined location of the client device as it requested and received data across the communications network.

At operation 308, the data processing system may collect user plane data. The data processing system may collect the user plane data from a user plane probe that is configured to receive or collect the user plane data. The user plane data may include identifiers (e.g., IMSIs, IP addresses, IMEI, etc.) of the client devices accessing the network, Cell-ID, MME-Ue-S1AP-ID, eNB-UE-S1AP-ID, and/or eUTRAN Contents data. In some instances, the user plane data may include quality of service (QoS) or quality of experience (QoE) data.

The user plane probe may be configured to collect or receive the user plane data from a core interface (e.g., a S1-U logical interface) of the network. For example, the user plane probe may be connected to an eNodeB of the network via an eNodeB trace port to monitor eUTRAN signaling information. The user plane probe may receive or detect user plane signaling data and transmit the user plane signaling data to the data processing system.

At operation 310, the data processing system may determine whether the data is video session data. The data processing system may do so using deep packet inspection on the data packets that it receives from the user plane probe. The data processing system may identify characteristics of the data packets (e.g., size, marker, payload type, synchronization source identifier, etc.) of the data packets and compare the characteristics to a database comprising relationships between data packet types and types of payloads of the data packets (e.g., video, email, http request, etc.). The data processing system may identify data packets with characteristics that match the characteristics of different data type in the database to determine data packet types.

Responsive to determining the user plane data is not video session data, at operation 312, the data processing system may store the user plane data. The data processing system may determine the user plane data is not video session data responsive to determining the user plane data does not match the characteristics in the database that correspond to a video content type. Upon such a determination, the data processing system may store the user plane data in a database. The database may be dedicated to storing user plane data or may otherwise only store user plane data.

However, responsive to determining the user plane data is matches the characteristics that correspond to the video content type, at operation 314, the data processing system may identify a signaling pattern of the video session data. As previously described, a signaling pattern may be a pattern of synchronization signals of one or frames that synchronizes the video providers to the respective client device to which the providers are streaming data. Each video provider may be associated with a different synchronization pattern that enables the video provider to connect with its respective application on client devices. The data processing system may identify the patterns of the synchronization signals by identifying the times or instances in which the synchronization patterns occur within a specific time period or number of radio frames.

At operation 316, the data processing system may determine whether the signaling pattern matches a pattern-application type pair from a database. A pattern-application type pair may be or include a signaling pattern and an application type that identifies the application that streamed the corresponding video or otherwise the video provider that streamed the video. The data processing system may determine whether the signaling pattern matches the pattern-application type pair from the database upon identifying the signaling pattern. To do so, the data processing system may compare the identified signaling pattern to pattern-application type pairs in the database and identify a pattern-application type pair with a matching signaling pattern.

Responsive to determining there is not a pattern-application type in the database that includes a matching signaling pattern, the data processing system may determine the video session data is uncategorized and, at operation 318, the data processing system may store the uncategorized video session data. The data processing system may store the uncategorized video session data in a database that includes video session data. The data processing system may summarize the uncategorized video session data into a record with video session data that spans a predetermined time interval (e.g., one minute, five minutes, 10 minutes, etc.) and store the uncategorized video session data. The record may have the IMSI value or another identifier of the client device that requested and/or played the video of the video session, timestamp data indicating when the video was transmitted to the client device, and/or video session parameters that may include various quality of service indicators or other KPIs of the video session. The data processing system may store the uncategorized video session data with a zero or null value in a data field of the record that would otherwise identify the type of the application or the video provider that provided the video session data.

However, responsive to identifying a matching pattern-application type pair, at operation 320, the data processing system may associate the application type of the matching pattern-application type pair with the video session data. The data processing system may associate the application type with the video session data when the data processing system generates a record for the video session. The data processing system may generate the record by including an identifier of the video provider associated with the type of the application that played the video with the other video session data such as the device identifier, timestamp information, and video session parameters. At operation 322, the data processing system may store the associated video session data. The data processing system may store the associated video session data in the same database in which the data processing system stored the uncategorized video session data.

At operation 324, the data processing system may correlate the stored video session data and control plane signaling data of a cell. The data processing system may correlate the stored video session data and the control plane signaling data by retrieving the datasets of control plane signaling data and video session data from their respective databases. The data processing system may identify records of video sessions that have matching IMSI or another device identifier and timestamps with call records of the control plane signaling data. The data processing system may correlate the matching data, for example, by using a JOIN function on the matched video session records and the control signaling data records (e.g., RRC records).

At operation 326, the data processing system may determine KPIs based on the correlated data. The data processing system may determine the KPIs based on the QoS indicators of the video session data of the correlated data. For example, the data processing system may determine a mean opinion score, packet jitter, packet loss, latency, delay, among other metrics of the video session signals that are provided to client devices. The data processing system may determine any KPIs. The data processing system may do so by analyzing the QoS data of the video sessions for which the data processing system is determining the KPIs. The data processing system may determine values for the KPIs using any method.

At operation 328, the data processing system may determine if a KPI satisfies a threshold. The data processing system may do so by comparing the values for the KPIs to one or more thresholds. The thresholds may each be individually associated with a KPI. Responsive to the data processing system determining a KPI exceeds a corresponding threshold, the data processing system may determine the threshold is satisfied.

Responsive to determining a KPI satisfies a threshold, at operation 330, the data processing system may identify the video provider associated with the KPI that satisfies the threshold. The data processing system may do so by identifying the application type that is associated with the video session with a KPI that exceeds the threshold and the video provider associated with the application type. At operation 332, the data processing system may transmit an identification of the video provider to a communications network provider. The data processing system may identify the identification of the video provider that is associated with the application type from a database and transmit the identification of the video provider to the communications network provider that facilitated transmission of the video session to the client device. With the identification of the video provider, the data processing system may transmit an identification of the KPI and/or the value of the KPI that exceeded the threshold. The communications network provider may receive the identification, the KPI, and/or the value and adjust its communications network as described herein (e.g., by adjusting the video resolution of videos provided by the video provider and/or the radio resources that the communications network allocates to the video provider) based on the received data. The data processing system may provide any data related to video providers to the communications network provider to adjust the communications network.

At operation 334, the data processing system may generate a heat map for the cell based on the KPIs. The heat map may be a square representing the geographical area of the cell. The square may have sub-bins (e.g., smaller squares) within the square that represent smaller areas within the cell. The data processing system may generate the heat map by identifying the geographic locations of the correlated video sessions and the KPIs associated with the video sessions. The data processing system may identify the sub-bins of the heat map that are associated with the identified geographic areas and associate the video sessions with the sub-bins. The data processing system may display KPI values as colors in each sub-bin according to a user selection. For example, the data processing system may cause the heat map to show data rates, data volume, resolution, user perceived quality, etc. of video sessions that were streamed to client devices within each sub-bin within a time period (e.g., a user selected time period or within a predetermined time period). Green sub-bins may mean positive performance, yellow sub-bins may mean medium performance, red sub-bins may mean poor performance, etc. Colors may mean any type of performance depending on the configuration of the data processing system.

At operation 336, the data processing system may provide the generated heat map to the communications network provider. The data processing system may provide the generated heat map or otherwise the correlated data that was used to generate the heat map to the communications network provider that facilitated the transmission of the video sessions across a communications network. In some embodiments, the data processing system may provide determined KPIs to the communications network provider. The communications network provider may provide the received heat map, correlated data, and/or determined KPIs to a machine learning model associated with the communications network and in turn adjust the communications network to improve how the communications network streams videos based on an output from the machine learning model. For example, the communications network provider may reduce latency of videos streamed across the communications network by adjusting the video resolution or data rate of video sessions that are transmitted from particular video providers. The communications network provider may adjust the configuration of the communications network to improve the performance of video streaming across the communications network in any manner.

It should be noted that method 300 is an example of many processes that may be performed using correlated control signaling data and video session data. For instance, the data processing system may access RAN signaling session storage and/or video session storage and apply correlated data to a machine learning model (e.g., random forest, neural network, k-means clustering, support vector machine, etc.) to analyze the data or provide the data to an outside entity (e.g., communications network provider 114) for similar processing. Such machine learning models may assess the data to determine items such as whether a cell is congested and consequently that radio resources need to be reallocated or whether user equipment at the cell edge is utilizing too many resources and needs to be dropped from the network.

Other examples of processes that the data processing system may perform with the geolocated correlated user plane data may include performance management (e.g., does the network provider need to create a new cell to offload cell capacity), fault management (e.g., is there an issue with the network or is the problem local to a piece of user equipment or a video server), optimization (e.g., can RF engineers tweak network configuration parameters to increase the capacity of the cell with acceptable quality), performance comparisons between video providers, and/or network optimization by feeding correlated data to an artificial intelligence or machine learning model of a SON system. The correlated data can be used in any manner.

Figure 4:
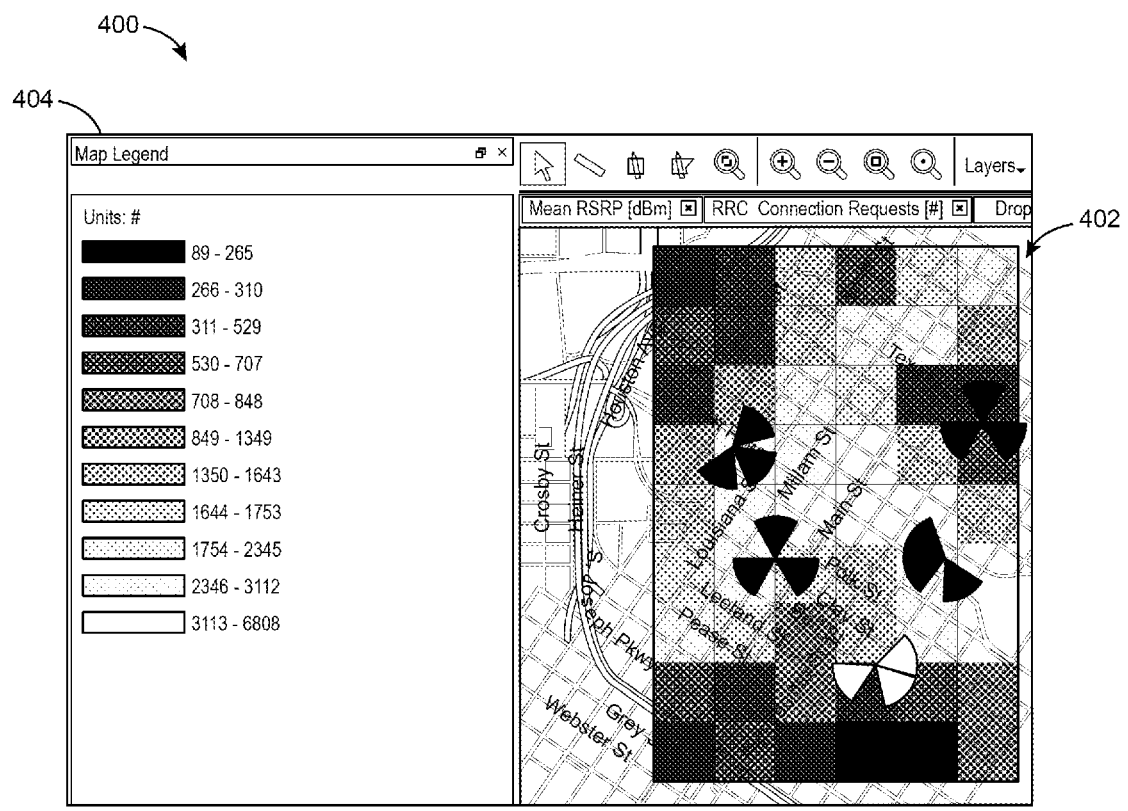
FIG. 4 is an example user interface of a heat map generated for a KPI for video session calls within a cell, in accordance with an implementation.

FIG. 4 is an example user interface 400 of a heat map 402 generated for a KPI for video session calls within a cell, in accordance with an implementation. A data processing system (e.g., video session analyzer 110) may generate user interface 400 to include heat map 402 and a map legend 404, which may illustrate a code of colors for a KPI that correspond to the colors of subcells of heat map 402. For example, the data processing system may generate heat map 402 to illustrate the number RRC connection requests that occurred within a cell. The cell may divided into different subcells. Map legend 404 may include colors that each correspond to a different number or range of RRC connection requests. The data processing system may generate heat map 402 so each subcell of heat map 402 is overlayed with a color that corresponds to the number of RRC connection requests that occurred within the respective subcell (e.g., within a time period set for the heat map) according to map legend 404. The data processing system may generate the heat map based on any KPI including KPIs of video session data.

Advantageously, by generating heat maps for different KPIs and/or for different video providers, self-organizing networks can use the heat maps to tune their network to improve video playback of any video streams that are provided across the self-organizing network or otherwise optimize the network. The self-organizing networks can identify video providers that are using a disproportionate amount of resources and reduce such resource use by reducing the video resolution or data rate of videos provided by the respective video providers. Furthermore, the self-organizing networks may prioritize video providers that are not using as many resources by enabling such video providers to provide higher resolution videos and/or increasing the packet rate associated with the video providers. Thus, implementation of the systems and methods described herein enable lower latency performance for videos streamed by all or a portion of video providers that are connected to the respective network. Furthermore, because of the disproportionate amount of network resources such video streaming requires, the optimization methods provided herein may enable the network to improve its connection with devices that are not streaming video.

Figure 5A:
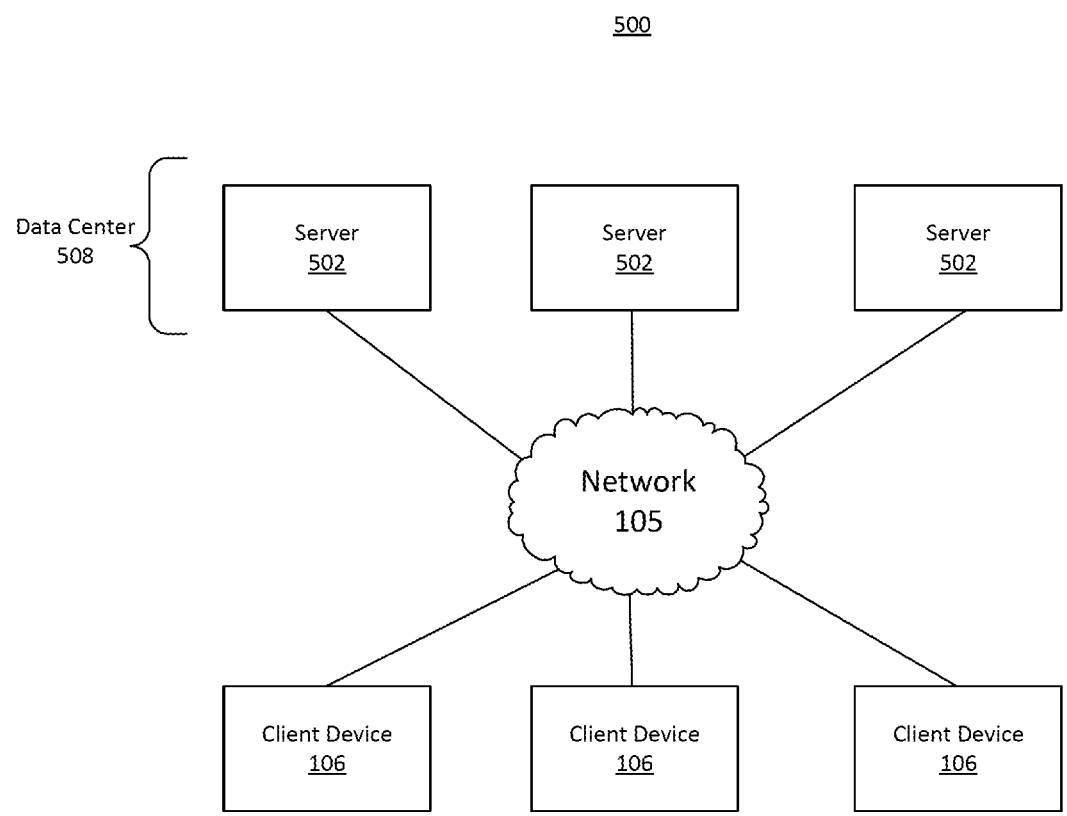
FIG. 5A is a block diagram depicting an implementation of a network environment including a client device in communication with a server device.

FIG. 5A depicts an example network environment that can be used in connection with the methods and systems described herein. In brief overview, the network environment 500 includes one or more clients devices 106 (also generally referred to as clients, client node, client machines, client computers, client computing devices, endpoints, or endpoint nodes) in communication with one or more servers 502 (also generally referred to as servers, nodes, or remote machine) via one or more networks 105. In some embodiments, a client 106 has the capacity to function as both a client node seeking access to resources provided by a server and as a server providing access to hosted resources for other clients 106.

Although FIG. 5A shows a network 105 between the clients 106 and the servers 502, the clients 106 and the servers 502 can be on the same network 105. In embodiments, there are multiple networks 105 between the clients 106 and the servers 502. The network 105 can include multiple networks such as a private network and a public network. The network 105 can include multiple private networks.

The network 105 can be connected via wired or wireless links. Wired links can include Digital Subscriber Line (DSL), coaxial cable lines, or optical fiber lines. The wireless links can include BLUETOOTH, Wi-Fi, Worldwide Interoperability for Microwave Access (WiMAX), an infrared channel or satellite band. The wireless links can also include any cellular network standards used to communicate among mobile devices, including standards that qualify as 1G, 2G, 3G, 4G, 5G or other standards. The network standards can qualify as one or more generation of mobile telecommunication standards by fulfilling a specification or standards such as the specifications maintained by International Telecommunication Union. Examples of cellular network standards include AMPS, GSM, GPRS, UMTS, LTE, LTE Advanced, Mobile WiMAX, and WiMAX-Advanced. Cellular network standards can use various channel access methods e.g. FDMA, TDMA, CDMA, or SDMA. In some embodiments, different types of data can be transmitted via different links and standards. In other embodiments, the same types of data can be transmitted via different links and standards.

The network 105 can be any type and/or form of network. The geographical scope of the network 105 can vary widely and the network 105 can be a body area network (BAN), a personal area network (PAN), a local-area network (LAN), e.g. Intranet, a metropolitan area network (MAN), a wide area network (WAN), or the Internet. The topology of the network 105 can be of any form and can include, e.g., any of the following: point-to-point, bus, star, ring, mesh, or tree. The network 105 can be an overlay network which is virtual and sits on top of one or more layers of other networks 105. The network 105 can be of any such network topology as known to those ordinarily skilled in the art capable of supporting the operations described herein. The network 105 can utilize different techniques and layers or stacks of protocols, including, e.g., the Ethernet protocol or the internet protocol suite (TCP/IP). The TCP/IP internet protocol suite can include application layer, transport layer, internet layer (including, e.g., IPv6), or the link layer. The network 105 can be a type of a broadcast network, a telecommunications network, a data communication network, or a computer network.

The network environment 500 can include multiple, logically grouped servers 502. The logical group of servers can be referred to as a data center 508 (or server farm or machine farm). In embodiments, the servers 502 can be geographically dispersed. The data center 508 can be administered as a single entity or different entities. The data center 508 can include multiple data centers 508 that can be geographically dispersed. The servers 502 within each data center 508 can be homogeneous or heterogeneous (e.g., one or more of the servers 502 or machines 502 can operate according to one type of operating system platform (e.g., WINDOWS NT, manufactured by Microsoft Corp. of Redmond, Wash.), while one or more of the other servers 502 can operate on according to another type of operating system platform (e.g., Unix, Linux, or Mac OS X)). The servers 502 of each data center 508 do not need to be physically proximate to another server 502 in the same machine farm 508. Thus, the group of servers 502 logically grouped as a data center 508 can be interconnected using a network. Management of the data center 508 can be de-centralized. For example, one or more servers 502 can comprise components, subsystems and modules to support one or more management services for the data center 508.

Server 502 can be a file server, application server, web server, proxy server, appliance, network appliance, gateway, gateway server, virtualization server, deployment server, SSL VPN server, or firewall. In embodiments, the server 502 can be referred to as a remote machine or a node. Multiple nodes can be in the path between any two communicating servers.

Figure 5B:
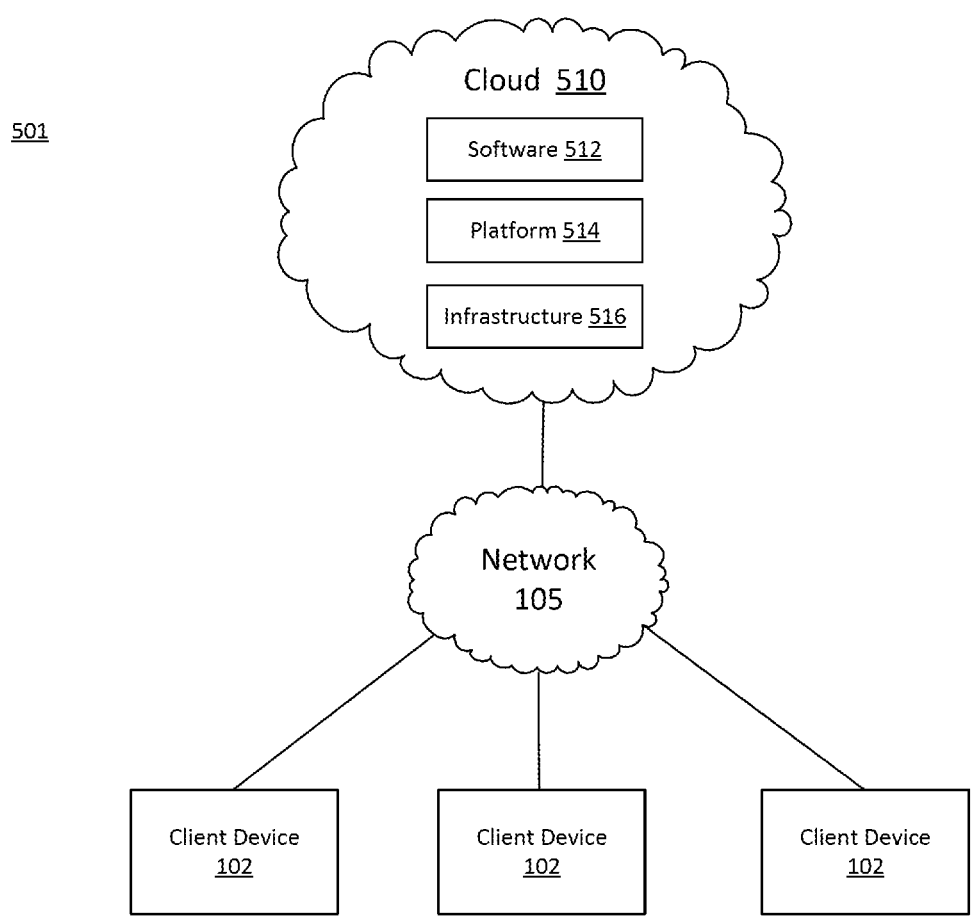
FIG. 5B is a block diagram depicting a cloud computing environment including a client device in communication with cloud service providers.

FIG. 5B illustrates an example cloud computing environment. A cloud computing environment 501 can provide client 106 with one or more resources provided by a network environment. The cloud computing environment 501 can include one or more clients 106, in communication with the cloud 510 over one or more networks 105. Clients 106 can include, e.g., thick clients, thin clients, and zero clients. A thick client can provide at least some functionality even when disconnected from the cloud 510 or servers 502. A thin client or a zero client can depend on the connection to the cloud 510 or server 502 to provide functionality. A zero client can depend on the cloud 510 or other networks 105 or servers 502 to retrieve operating system data for the client device. The cloud 510 can include back end platforms, e.g., servers 502, storage, server farms or data centers.

The cloud 510 can be public, private, or hybrid. Public clouds can include public servers 502 that are maintained by third parties to the clients 106 or the owners of the clients. The servers 502 can be located off-site in remote geographical locations as disclosed above or otherwise. Public clouds can be connected to the servers 502 over a public network. Private clouds can include private servers 502 that are physically maintained by clients 106 or owners of clients. Private clouds can be connected to the servers 502 over a private network 105. Hybrid clouds 508 can include both the private and public networks 105 and servers 502.

The cloud 510 can also include a cloud-based delivery, e.g. Software as a Service (SaaS) 512, Platform as a Service (PaaS) 514, and the Infrastructure as a Service (IaaS) 516. IaaS can refer to a user renting the use of infrastructure resources that are needed during a specified time period. IaaS providers can offer storage, networking, servers or virtualization resources from large pools, allowing the users to quickly scale up by accessing more resources as needed. PaaS providers can offer functionality provided by IaaS, including, e.g., storage, networking, servers or virtualization, as well as additional resources such as, e.g., the operating system, middleware, or runtime resources. SaaS providers can offer the resources that PaaS provides, including storage, networking, servers, virtualization, operating system, middleware, or runtime resources. In some embodiments, SaaS providers can offer additional resources including, e.g., data and application resources.

Clients 106 can access IaaS resources, SaaS resources, or PaaS resources. In embodiments, access to IaaS, PaaS, or SaaS resources can be authenticated. For example, a server or authentication server can authenticate a user via security certificates, HTTPS, or API keys. API keys can include various encryption standards such as, e.g., Advanced Encryption Standard (AES). Data resources can be sent over Transport Layer Security (TLS) or Secure Sockets Layer (SSL).

The client 106 and server 502 can be deployed as and/or executed on any type and form of computing device, e.g. a computer, network device or appliance capable of communicating on any type and form of network and performing the operations described herein.

Figure 5C:
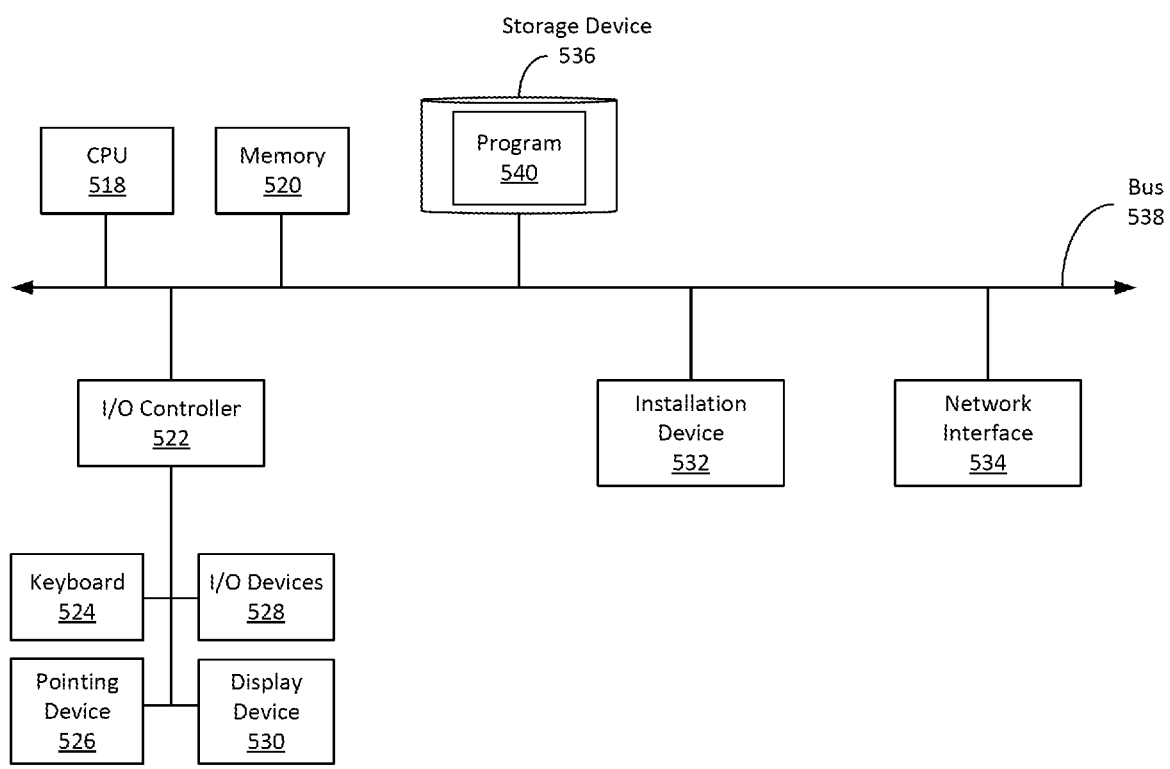
FIG. 5C is a block diagram depicting an implementation of a computing device that can be used in connection with the systems depicted in FIGS. 1, 5A and 5B and the method depicted in FIG. 3.

FIG. 5C depicts block diagrams of a computing device 503 useful for practicing an embodiment of the client 106 or a server 502. As shown in FIG. 5C, each computing device 503 can include a central processing unit 518, and a main memory unit 520. As shown in FIG. 5C, a computing device 503 can include one or more of a storage device 536, an installation device 532, a network interface 534, an I/O controller 522, a display device 530, a keyboard 524 or a pointing device 526, e.g. a mouse. The storage device 536 can include, without limitation, a program 540, such as an operating system, software, or software associated with system 100.

The central processing unit 518 is any logic circuitry that responds to and processes instructions fetched from the main memory unit 520. The central processing unit 518 can be provided by a microprocessor unit, e.g.: those manufactured by Intel Corporation of Mountain View, Calif. The computing device 503 can be based on any of these processors, or any other processor capable of operating as described herein.

The central processing unit 518 can utilize instruction level parallelism, thread level parallelism, different levels of cache, and multi-core processors. A multi-core processor can include two or more processing units on a single computing component.

Main memory unit 520 can include one or more memory chips capable of storing data and allowing any storage location to be directly accessed by the microprocessor 518. Main memory unit 520 can be volatile and faster than storage 536 memory. Main memory units 520 can be Dynamic random access memory (DRAM) or any variants, including static random access memory (SRAM). The memory 520 or the storage 536 can be non-volatile; e.g., non-volatile read access memory (NVRAM). The memory 520 can be based on any type of memory chip, or any other available memory chips. In the example depicted in FIG. 5C, the processor 518 can communicate with memory 520 via a system bus 538.

A wide variety of I/O devices 528 can be present in the computing device 503. Input devices 528 can include keyboards, mice, trackpads, trackballs, touchpads, touch mice, multi-touch touchpads and touch mice, microphones, multi-array microphones, drawing tablets, cameras, or other sensors. Output devices can include video displays, graphical displays, speakers, headphones, or printers.

I/O devices 528 can have both input and output capabilities, including, e.g., haptic feedback devices, touchscreen displays, or multi-touch displays. Touchscreen, multi-touch displays, touchpads, touch mice, or other touch sensing devices can use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices can allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, can have larger surfaces, such as on a table-top or on a wall, and can also interact with other electronic devices. Some I/O devices 528, display devices 530 or group of devices can be augmented reality devices. The I/O devices can be controlled by an I/O controller 522 as shown in FIG. 5C. The I/O controller 522 can control one or more I/O devices, such as, e.g., a keyboard 524 and a pointing device 526, e.g., a mouse or optical pen. Furthermore, an I/O device can also provide storage and/or an installation device 532 for the computing device 503. In embodiments, the computing device 503 can provide USB connections (not shown) to receive handheld USB storage devices. In embodiments, an I/O device 528 can be a bridge between the system bus 538 and an external communication bus, e.g. a USB bus, a SCSI bus, a FireWire bus, an Ethernet bus, a Gigabit Ethernet bus, a Fibre Channel bus, or a Thunderbolt bus.

In embodiments, display devices 530 can be connected to I/O controller 522. Display devices can include, e.g., liquid crystal displays (LCD), electronic papers (e-ink) displays, flexile displays, light emitting diode displays (LED), or other types of displays. In some embodiments, display devices 530 or the corresponding I/O controllers 522 can be controlled through or have hardware support for OPENGL or DIRECTX API or other graphics libraries. Any of the I/O devices 528 and/or the I/O controller 522 can include any type and/or form of suitable hardware, software, or combination of hardware and software to support, enable or provide for the connection and use of one or more display devices 530 by the computing device 503. For example, the computing device 503 can include any type and/or form of video adapter, video card, driver, and/or library to interface, communicate, connect or otherwise use the display devices 530. In embodiments, a video adapter can include multiple connectors to interface to multiple display devices 530.

The computing device 503 can include a storage device 536 (e.g., one or more hard disk drives or redundant arrays of independent disks) for storing an operating system or other related software, and for storing application software programs 540 such as any program related to the systems, methods, components, modules, elements, or functions depicted in FIG. 1, 2A, 2B, 2C or 2D. Examples of storage device 536 include, e.g., hard disk drive (HDD); optical drive including CD drive, DVD drive, or BLU-RAY drive; solid-state drive (SSD); USB flash drive; or any other device suitable for storing data. Storage devices 536 can include multiple volatile and non-volatile memories, including, e.g., solid state hybrid drives that combine hard disks with solid state cache. Storage devices 536 can be non-volatile, mutable, or read-only. Storage devices 536 can be internal and connect to the computing device 503 via a bus 538. Storage device 536 can be external and connect to the computing device 503 via an I/O device 530 that provides an external bus. Storage device 536 can connect to the computing device 503 via the network interface 534 over a network 105. Some client devices 106 may not require a non-volatile storage device 536 and can be thin clients or zero clients 106. Some storage devices 536 can be used as an installation device 532 and can be suitable for installing software and programs.

The computing device 503 can include a network interface 534 to interface to the network 105 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). The computing device 503 can communicate with other computing devices 503 via any type and/or form of gateway or tunneling protocol e.g. Secure Socket Layer (SSL) or Transport Layer Security (TLS), QUIC protocol, or the Citrix Gateway Protocol manufactured by Citrix Systems, Inc. of Ft. Lauderdale, Fla. The network interface 534 can include a built-in network adapter, network interface card, PCMCIA network card, EXPRESSCARD network card, card bus network adapter, wireless network adapter, USB network adapter, modem or any other device suitable for interfacing the computing device 503 to any type of network capable of communication and performing the operations described herein.

A computing device 503 of the sort depicted in FIG. 5C can operate under the control of an operating system, which controls scheduling of tasks and access to system resources. The computing device 503 can be running any operating system configured for any type of computing device, including, for example, a desktop operating system, a mobile device operating system, a tablet operating system, or a smartphone operating system.

The computer device 503 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer device 503 has sufficient processor power and memory capacity to perform the operations described herein. In some embodiments, the computing device 503 can have different processors, operating systems, and input devices consistent with the device.

In embodiments, the status of one or more machines 106, 502 in the network 105 can be monitored as part of network management. In embodiments, the status of a machine can include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information can be identified by a plurality of metrics, and the plurality of metrics can be applied at least in part towards decisions in load distribution, network traffic management, and network failure recovery as well as any aspects of operations of the present solution described herein.

The processes, systems and methods described herein can be implemented by the computing device 503 in response to the CPU 518 executing an arrangement of instructions contained in main memory 520. Such instructions can be read into main memory 520 from another computer-readable medium, such as the storage device 536. Execution of the arrangement of instructions contained in main memory 520 causes the computing device 503 to perform the illustrative processes described herein. One or more processors in a multi-processing arrangement may also be employed to execute the instructions contained in main memory 520. Hard-wired circuitry can be used in place of or in combination with software instructions together with the systems and methods described herein. Systems and methods described herein are not limited to any specific combination of hardware circuitry and software.

Although an example computing system has been described in FIG. 5, the subject matter including the operations described in this specification can be implemented in other types of digital electronic circuitry, or in computer software, firmware, or hardware, including the structures disclosed in this specification and their structural equivalents, or in combinations of one or more of them.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "computing device" or "component" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the probes 102 and/or 104 or video session analyzer 110) to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks. The processor and the memory can be supplemented by, or incorporated in, special purpose logic circuitry.

While operations are depicted in the drawings in a particular order, such operations are not required to be performed in the particular order shown or in sequential order, and all illustrated operations are not required to be performed. Actions described herein can be performed in a different order. The separation of various system components does not require separation in all implementations, and the described program components can be included in a single hardware or software product.

The phraseology and terminology used herein is for the purpose of description and should not be regarded as limiting. Any references to implementations or elements or acts of the systems and methods herein referred to in the singular may also embrace implementations including a plurality of these elements, and any references in plural to any implementation or element or act herein may also embrace implementations including only a single element. Any implementation disclosed herein may be combined with any other implementation or embodiment.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A method comprising:

collecting, by one or more processors, control plane signaling data comprising geographic location data from network monitoring equipment connected to a communications network;

collecting, by the one or more processors, video session data comprising data of a plurality of video sessions from video monitoring equipment connected to the communications network, a plurality of mobile devices streaming the plurality of video sessions on applications executing on the plurality of mobile devices across the communications network;

correlating, by the one or more processors, the video session data and the control plane signaling data within a cell of the communications network based at least on the geographic location data of the control plane signaling data;

determining, by the one or more processors, application types of the applications that streamed the plurality of video sessions, each application type associated with a different set of video servers that stream videos to a corresponding application for playback, wherein determining the application types of the applications comprises:

determining patterns in streaming signals of the plurality of video sessions;

comparing the determined patterns to pattern-application type pairs stored in a database; and determining the application types according to the determined patterns that match the pattern-application type pairs;

determining, by the one or more processors, key performance indicators for each of the application types based on the correlated video session data and control plane signaling data; and providing, by the one or more processors, to a communications network provider associated with the communications network, the key performance indicators, wherein the communications network provider reorganizes the communications network according to the key performance indicators to provide improved communications network performance.

2. The method of claim 1, further comprising:
generating, by the one or more processors, a heat map illustrating the key performance indicators.

3. The method of claim 1, wherein the communications network provider reorganizes the communications network by adjusting the video resolution and data rate of video sessions streamed across the communications network.

4. The method of claim 1, further comprising:
generating, by the one or more processors, a heat map illustrating the determined key performance indicators for each of the application types.

5. The method of claim 1, wherein correlating the control plane signaling data and the video session data comprises:
retrieving, by the one or more processors from a first database storing video session data, first international mobile subscriber identities (IMSIs) and first timestamps associated with the plurality of video sessions;
retrieving, by the one or more processors from a second database storing control plane signaling data, second IMSIs and second timestamps associated with the control plane signaling data; and
matching, by the one or more processors, the plurality of video sessions to the control plane signaling data according to first IMSIs and first timestamps matching second IMSIs and second timestamps.

6. The method of claim 1, further comprising:
comparing, by the one or more processors, the video session data to a first set of rules identifying a first type of application and correlated control plane signal data to a second set of rules; and
generating, by the one or more processors, a heat map that only includes key performance indicators of video session data that satisfies the first set of rules identifying the first type of application and that is correlated with control plane signal data that satisfies the second set of rules.

7. A method comprising:
collecting, by one or more processors, control plane signaling data comprising geographic location data from network monitoring equipment connected to a communications network;
collecting, by the one or more processors, video session data comprising data of a plurality of video sessions from video monitoring equipment connected to the communications network, a plurality of mobile devices streaming the plurality of video sessions on applications executing on the plurality of mobile devices across the communications network;
correlating, by the one or more processors, the video session data and the control plane signaling data within a cell of the communications network based at least on the geographic location data of the control plane signaling data;
determining, by the one or more processors, application types of the applications that streamed the plurality of video sessions, each application type associated with a different set of video servers that stream videos to a corresponding application for playback;
determining, by the one or more processors, key performance indicators for each of the application types based on the correlated video session data and control plane signaling data;

comparing, by the one or more processors, the key performance indicators for the application types to one or more thresholds;
identifying, by the one or more processors, a first key performance indicator for a first application type that exceeds a threshold, the first application type associated with a first set of video servers; and
transmitting, by the one or more processors, an indication that the first key performance indicator for the first application type exceeds the threshold to a communications network provider associated with the communications network,
wherein the communications network provider reorganizes the communications network by adjusting the video resolution or radio resources for videos streamed across the communications network by the first set of video servers responsive to receiving the indication.

8. A system comprising:
one or more processors in communication with video monitoring equipment connected to the communications network and network monitoring equipment connected to the communications network, the processor having programmed instructions that, when executed, cause the processor to:
collect control plane signaling data comprising geographic location data from the network monitoring equipment connected to the communications network;
collect video session data comprising data of a plurality of video sessions from the video monitoring equipment connected to the communications network, a plurality of mobile devices streaming the video sessions on applications executing on the plurality of mobile devices across the communications network;
correlate the video session data and the control plane signaling data within a cell of the communications network based at least on the geographic location data of the control plane signaling data;
determine application types of the applications that streamed the plurality of video sessions, each application type associated with a different set of video servers that stream videos to a corresponding application for playback, wherein determining the application types of the applications comprises:
determining patterns in streaming signals of the plurality of video sessions;
comparing the determined patterns to pattern-application type pairs stored in a database; and
determining the application types according to the determined patterns that match the pattern-application type pairs;
determine key performance indicators for each of the application types based on the correlated video session data and control plane signaling data; and
provide, to a communications network provider associated with the communications network, the key performance indicators,
wherein the communications network provider reorganizes the communications network according to the key performance indicators.

9. The system of claim 8, wherein the instructions further cause the processor to:
generate, on a display, a heat map illustrating the key performance indicators.

10. The system of claim 8, wherein the communications network provider reorganizes the communications network by adjusting the video resolution and data rate of video sessions streamed across the communications network.

11. The system of claim 8, wherein the instructions cause the one or more processors to correlate the control plane signaling data and the video session data by:
retrieving, from a first database storing video session data, first international mobile subscriber identities (IMSIs) and first timestamps associated with the plurality of video sessions;
retrieving, from a second database storing control plane signaling data, second IMSIs and second timestamps associated with the control plane signaling data; and
matching, by the one or more processors, the plurality of video sessions to the control plane signaling data according to first IMSIs and first timestamps matching second IMSIs and second timestamps.

12. A non-transitory computer-readable storage medium storing executable instructions that, when executed by one or more processors, cause the one or more processors to provide improve communications network performance, the instructions comprising instructions to:
collect control plane signaling data comprising geographic location data from network monitoring equipment connected to the communications network;
collect video session data comprising data of a plurality of video sessions from video monitoring equipment connected to the communications network, a plurality of mobile devices streaming the video sessions on applications executing on the plurality of mobile devices across the communications network;
correlate the video session data and the control plane signaling data within a cell of the communications network based at least on the geographic location data of the control plane signaling data;
determine application types of the applications that played the plurality of video sessions, each application type associated with a different set of video servers that stream videos to a corresponding application for playback, wherein determining the application types of the applications comprises:
determining patterns in streaming signals of the plurality of video sessions;
comparing the determined patterns to pattern-application type pairs stored in a database; and
determining the application types according to the determined patterns that match the pattern-application type pairs;
determine key performance indicators of the plurality of video sessions within the cell for each of the application types based on the correlated video session data and control plane signaling data; and
provide, to a communications network provider associated with the communications network, the determined key performance indicators,
wherein the communications network provider reorganizes the communications network according to the determined key performance indicators to provide improved communications network performance.

13. The non-transitory computer-readable storage medium of claim 12, wherein the communications network provider reorganizes the communications network by adjusting the video resolution and data rate of video sessions streamed across the communications network.

* * * * *